(12) United States Patent
Gan et al.

(10) Patent No.: US 7,206,893 B2
(45) Date of Patent: Apr. 17, 2007

(54) LINKING METHOD UNDER MOTHER AND CHILD BLOCK ARCHITECTURE FOR BUILDING CHECK AREA AND LOGIC PAGE OF THE CHILD BLOCK

(75) Inventors: Wee-Kuan Gan, Hsinchu Hsien (TW); Chu-Cheng Liang, Hsinchu Hsien (TW)

(73) Assignee: Phison Electronics Corp., Hsinchu Hsien (TW)

( * ) Notice: Subject to any disclaimer, the term of this patent is extended or adjusted under 35 U.S.C. 154(b) by 239 days.

(21) Appl. No.: 10/733,397

(22) Filed: Dec. 12, 2003

(65) Prior Publication Data

US 2005/0132125 A1    Jun. 16, 2005

(51) Int. Cl.
*G06F 12/12* (2006.01)

(52) U.S. Cl. ...................... 711/103; 711/156

(58) Field of Classification Search ................ 711/103, 711/156

See application file for complete search history.

(56) References Cited

U.S. PATENT DOCUMENTS

2002/0147882 A1* 10/2002 Pua et al. .................. 711/103

* cited by examiner

*Primary Examiner*—Brian R. Peugh
*Assistant Examiner*—Jared Rutz
(74) *Attorney, Agent, or Firm*—Birch, Stewart, Kolasch & Birch, LLP

(57) ABSTRACT

A method of reducing the frequency of erasing steps of a flash memory is described. A linking method under a mother and a child block architecture for building a check area and a logic page of the child block in order to reduce the frequency of erasing steps of the flash memory so that the service life of the flash memory can be extended and also the processing speed can be promoted.

3 Claims, 14 Drawing Sheets

Block A (Mother Block)

| Page0 |
| Page1 |
| Page2 |
| Page3 |
| Page4 |
| ⋮ |
| PageN-1 |
| PageN |

Locate a new block B and define as child block and the old block as mother block. Write the data into page 0 of the child block.

Block B (Child Block)

| Page3 |
|  |
|  |
|  |
|  |
|  |
|  |
|  |

Block 0 (Mother Block)

| Page0 |
| Page1 |
| Page2 |
| Page3 |
| Page4 |
| ... |
| PageN-1 |
| PageN |

Erase the old block and replace by block 0.

Block 0

| Page0 |
| Page1 |
| Page2 |
| Page3 |
| Page4 |
| ... |
| PageN-1 |
| PageN |

*PRIOR ART*
*FIG. 6*

LINKING METHOD UNDER MOTHER AND CHILD BLOCK ARCHITECTURE FOR BUILDING CHECK AREA AND LOGIC PAGE OF THE CHILD BLOCK

BACKGROUND OF THE INVENTION

1. The Field of the Invention

The present invention relates to a linking method under the mother and child block architecture for building check area and logic page of the child block for reducing the frequency of the erasing steps of the flash memory for extending the service life and to promote the operating speed thereof.

2. Description of the Related Art

The flash memory has been advantageously used in a variety of portable devices because of its unique characteristics, such as, low power consumption, non-volatile, high shock-tolerance and high storage density, gradually replacing EEPROM or other memory devices that requires a battery for operation thereof. Additionally, with the dramatic improvement of the semi-conductor technologies, the flash memory can achieve higher and better storage density and transmission speed, and accordingly the flash memory desirably replaces the traditional storage media, such as the hard disk driver in many applications.

However, the flash memory has certain limitation, in that, requires new space management for storage system. Besides, a new erasing method is required for evenly erasing the storage area in order to reduce the frequency of erasing, and thus the service life of the flash memory can be substantially extended and the power consumption of the system can be accordingly reduced. In the storage system of the flash memory, an inappropriate management causes an increase in the cost and cuts the service life of the flash memory short.

Referring to FIGS. 1, 2, 3, 4, 5 and 6, a conventional writing method is shown. As shown in FIGS. 1, 2, 3, 4, 5 and 6, the manager is ready for writing two pages into the flash memory from page 3 of block 0, the flash memory will find a new block, block 1B and defines block 0 as an old block, block 0A. Next, the page above page 3 of block 0A to block 1B is moved, and then the manager writes the page into page 3 and 4 of block 1B, then moves the page below page 4 of block 0A to block 1B, and then erases block 0A and replaces it by the block 1B to complete the writing step.

However, based on the physical characteristics of the flash memory, damage to the internal structure of the flash memory can easily occur after one million times of erasing steps. Accordingly, for extending the service life of the flash memory, the frequency of the erasing steps must be reduced. As described above, to write data, the flash memory has to locate a new block and erase the old one, in doing so, after one million erasure steps, the flash memory get easily damaged. Accordingly, finding a way to reduce the frequency of erasing steps of the flash memory for extending the service life thereof has become a priority in the field.

SUMMARY OF THE INVENTION

Accordingly, in the view of the foregoing, the present inventor makes a detailed study of related art to evaluate and consider, and uses years of accumulated experience in this field, and through several experiments, to create a method for reducing the frequency of erasing steps of the flash memory. The present invention provides an innovative, cost effective method for reducing the frequency of erasing steps of the flash memory so that the service life of the flash memory can be substantially promoted.

According to an aspect of the present invention, a linking method under a mother and a child block architecture for building a check area and a logic page of the child block is used in order to reduce the frequency of erasing steps of the flash memory and thereby extend the service life of the flash memory and also to promote the processing speed thereof.

BRIEF DESCRIPTION OF THE DRAWING

For a more complete understanding of the present invention, reference will now be made to the following detailed description of preferred embodiments taken in conjunction with the following accompanying drawings.

FIG. 6 is a flow chart showing a conventional writing method.

DETAILED DESCRIPTION OF PREFERRED EMBODIMENTS

Figure 1:
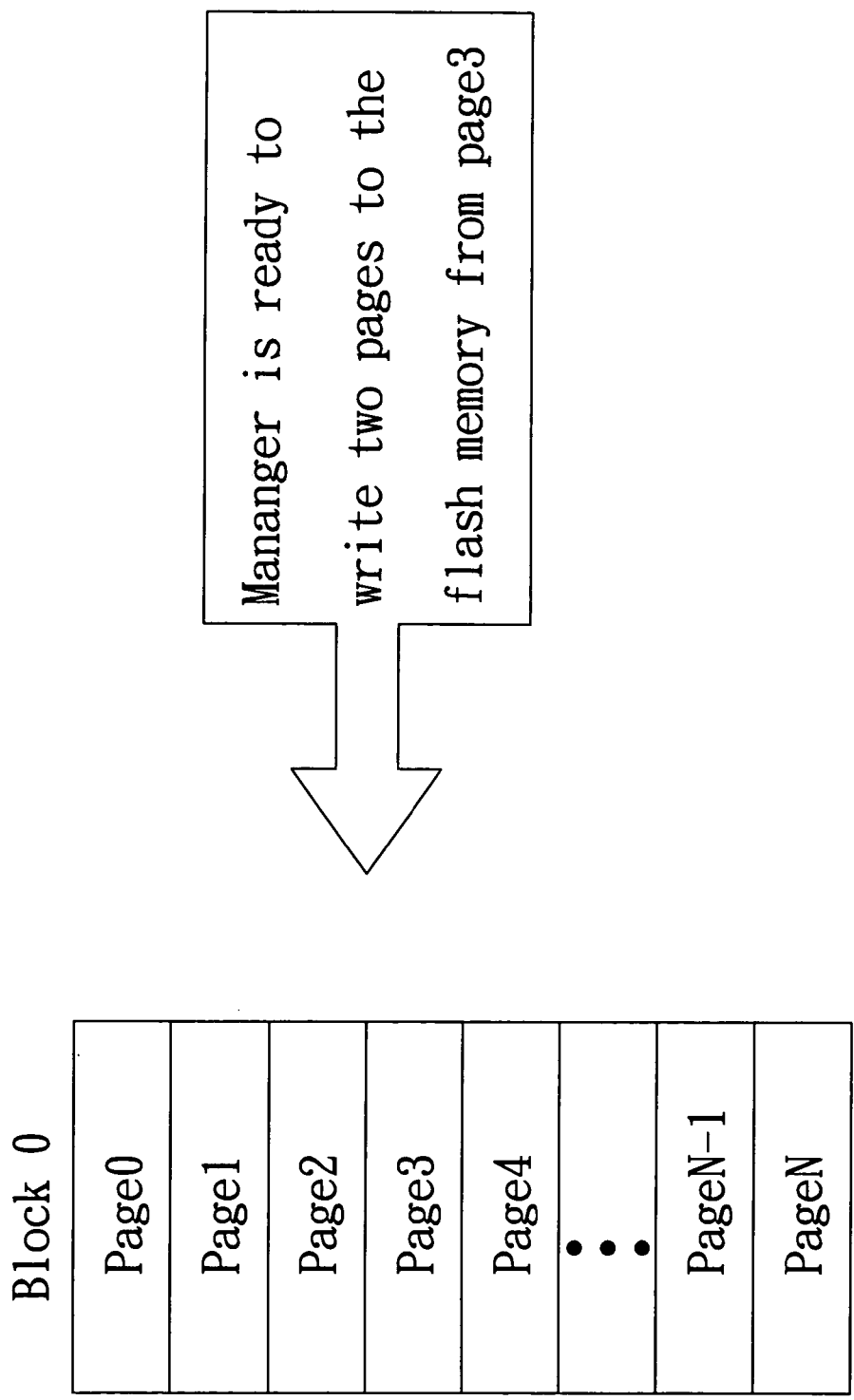
FIG. 1 is a flow chart showing a conventional writing method.
Figure 2:
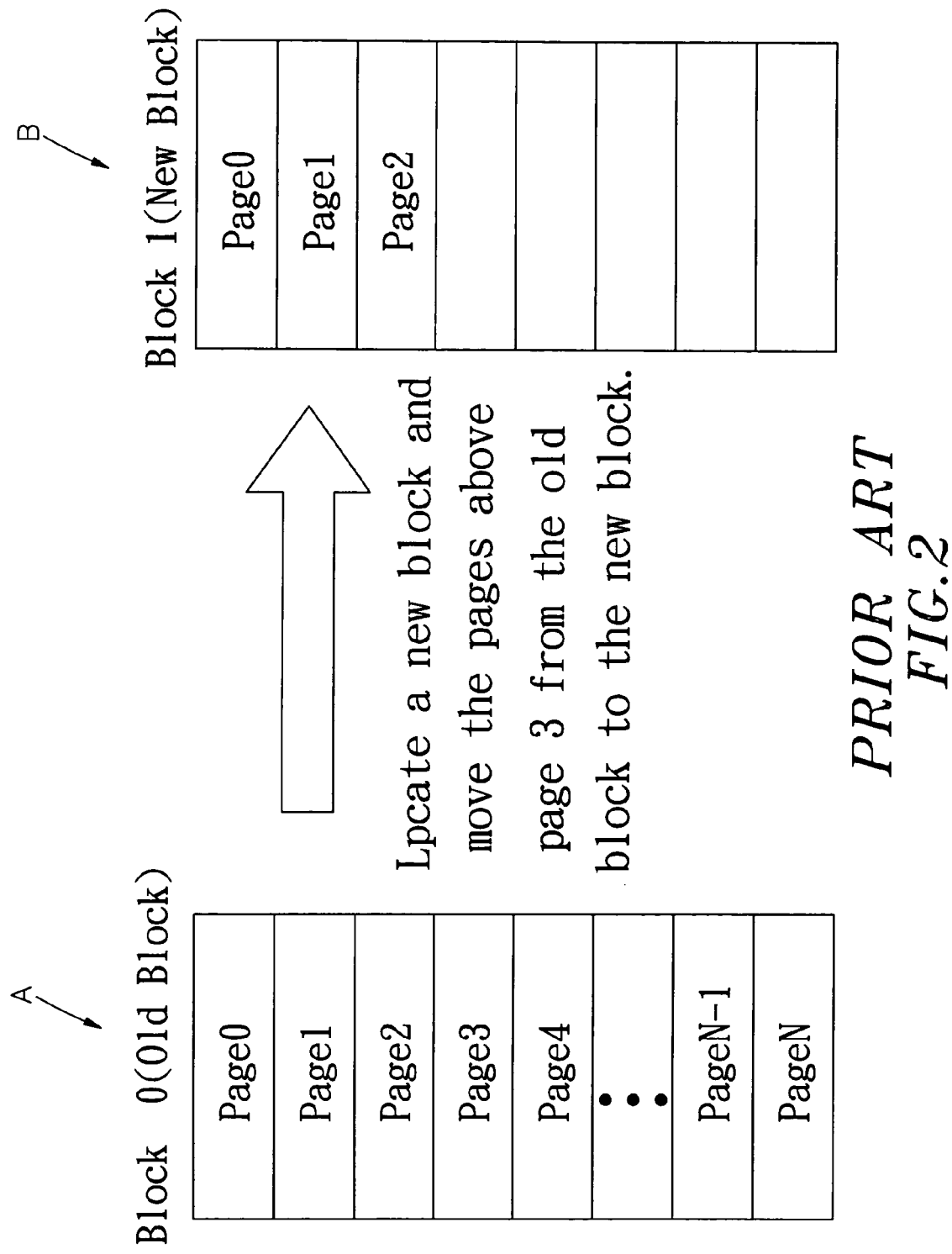
FIG. 2 is a flow chart showing a conventional writing method.
Figure 3:
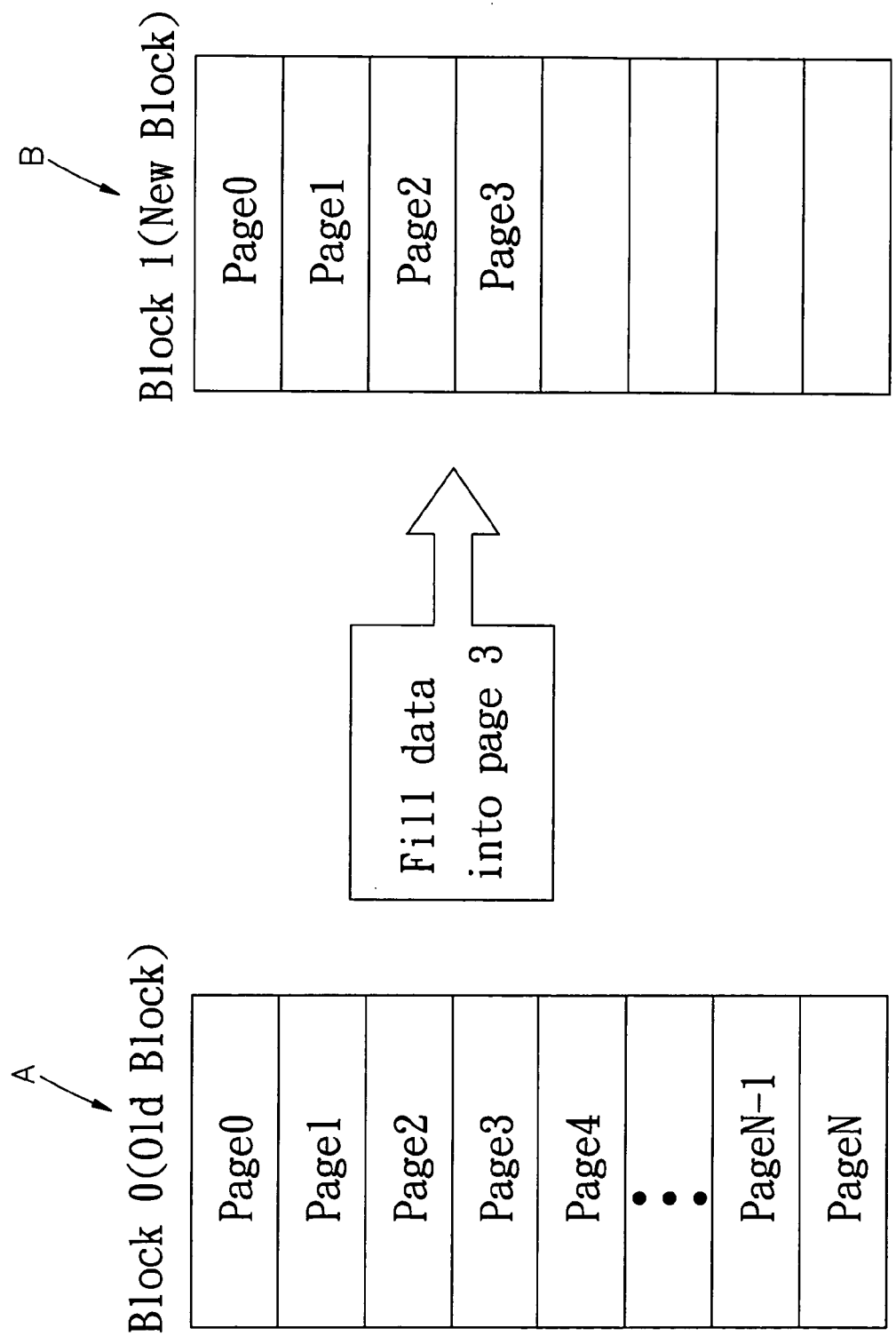
FIG. 3 is a flow chart showing a conventional writing method.
Figure 4:
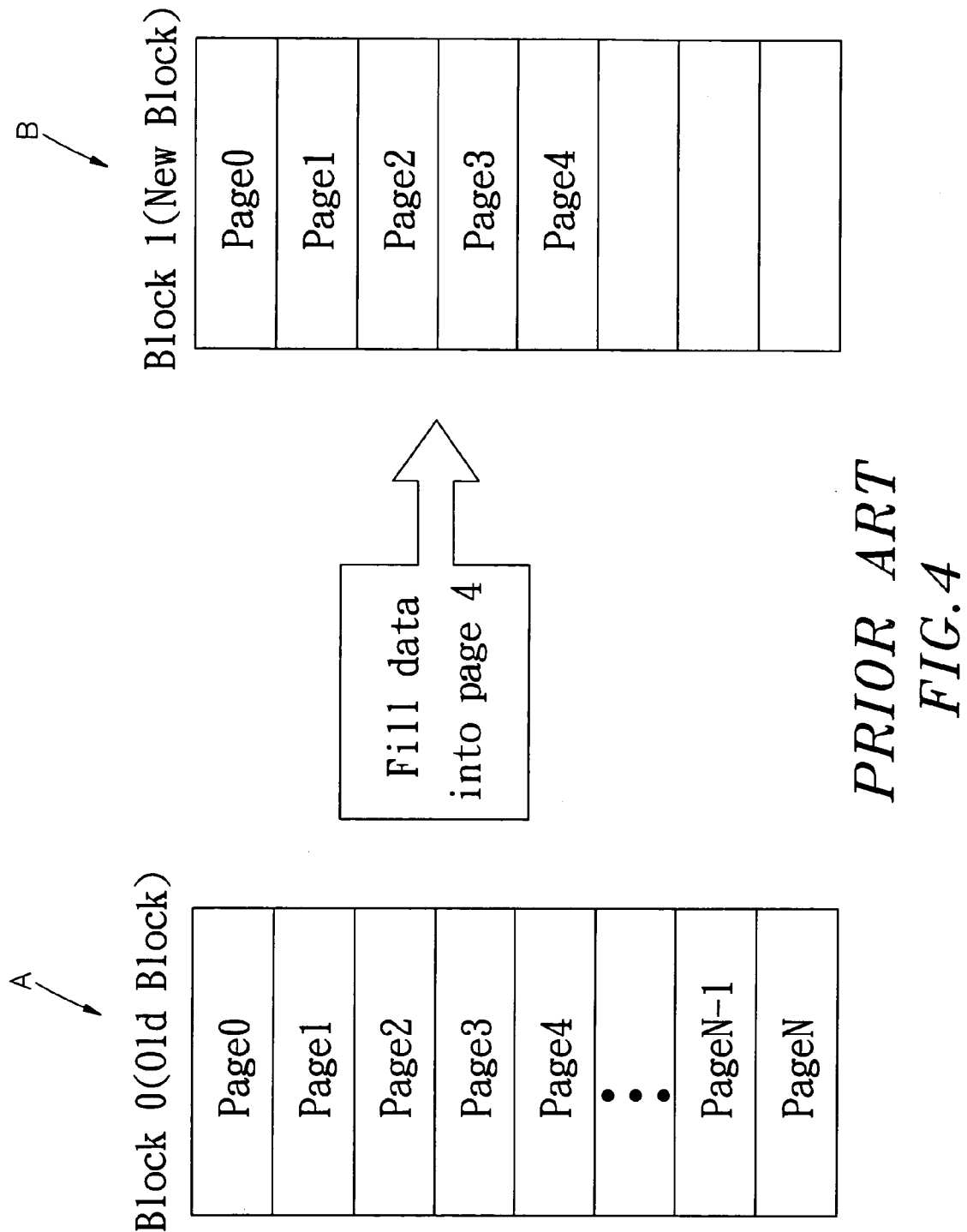
FIG. 4 is a flow chart showing a conventional writing method.
Figure 5:
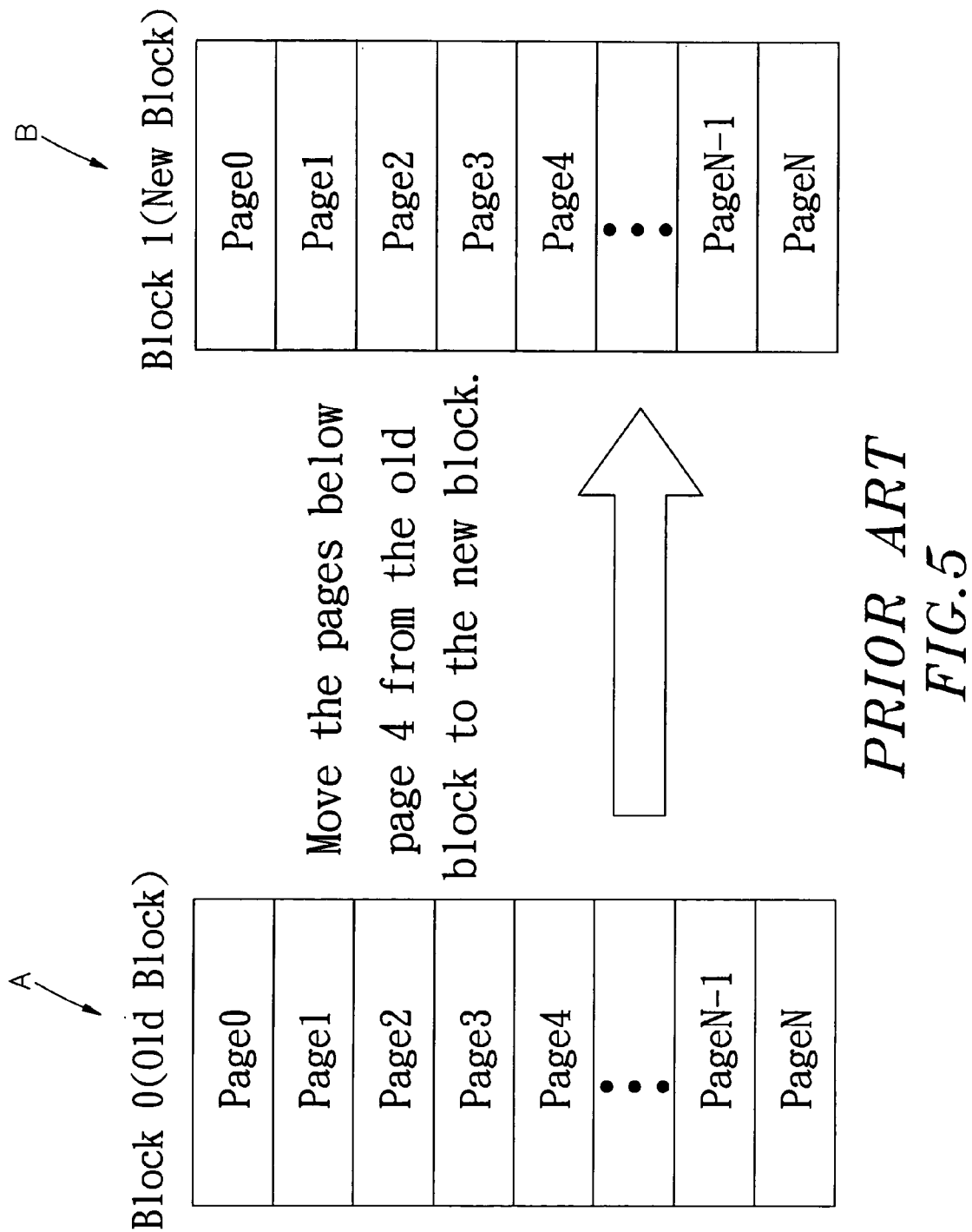
FIG. 5 is a flow chart showing a conventional writing method.

Reference will be made in detail to the preferred embodiments of the invention, examples of which are illustrated in the accompanying drawings. Wherever possible, the same reference numbers are used in the drawings and the description to refer to the same or like parts.

Figure 7:
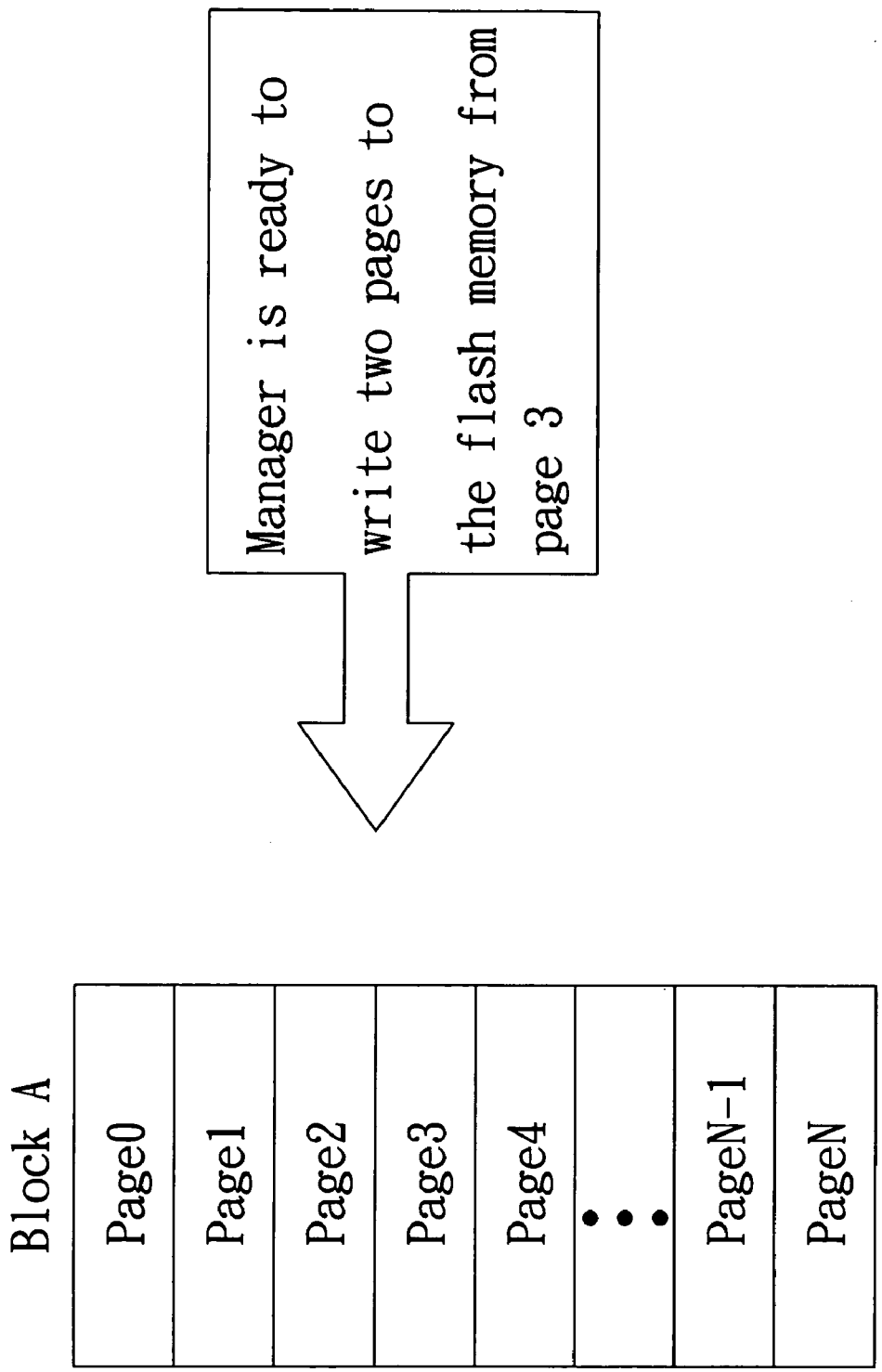
FIG. 7 is a flow chart showing a writing method according to a preferred embodiment of the present invention.
Figure 8A:
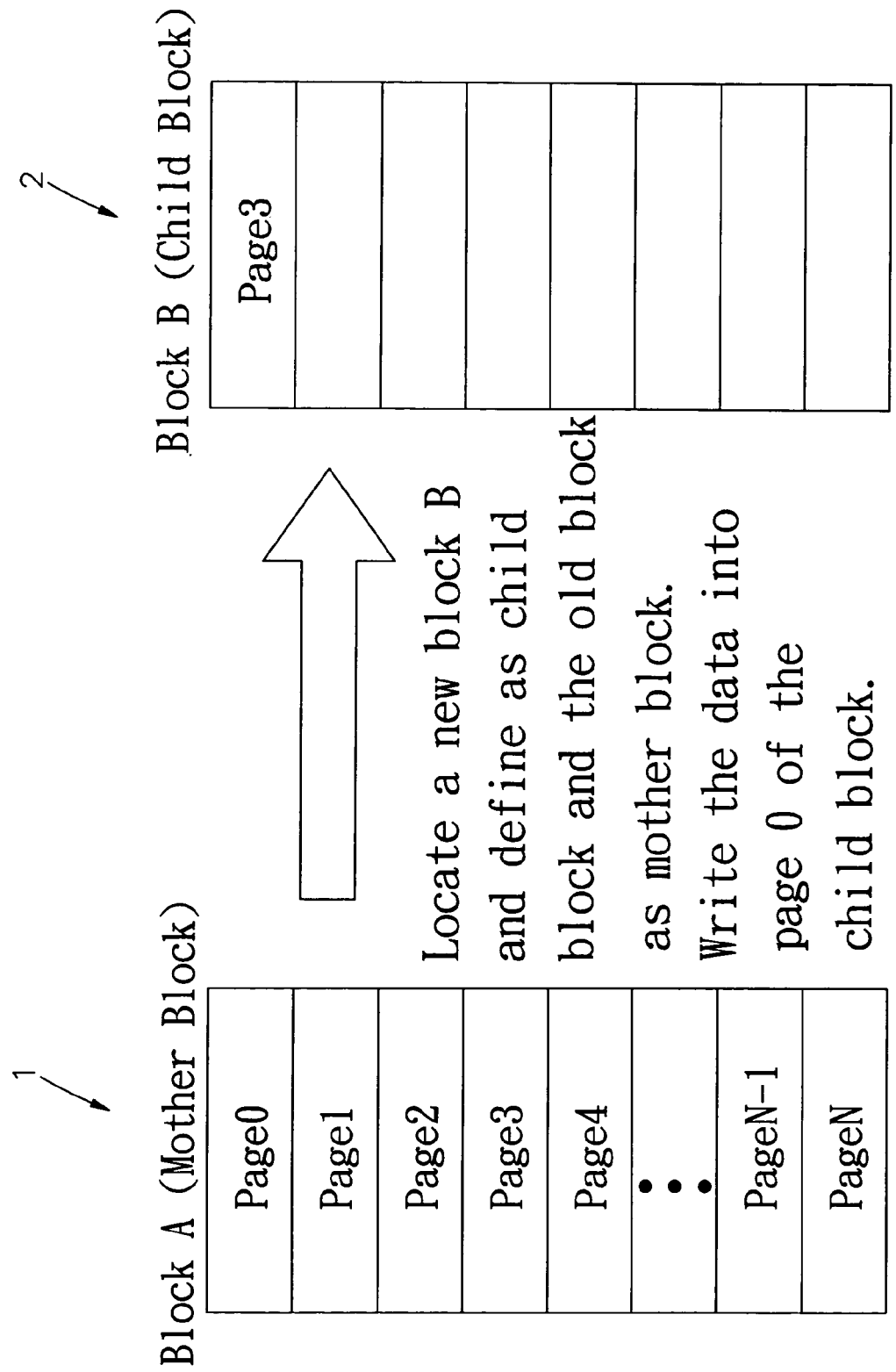
FIG. 8A is a flow chart showing a writing method according to a preferred embodiment of the present invention.
Figure 8B:
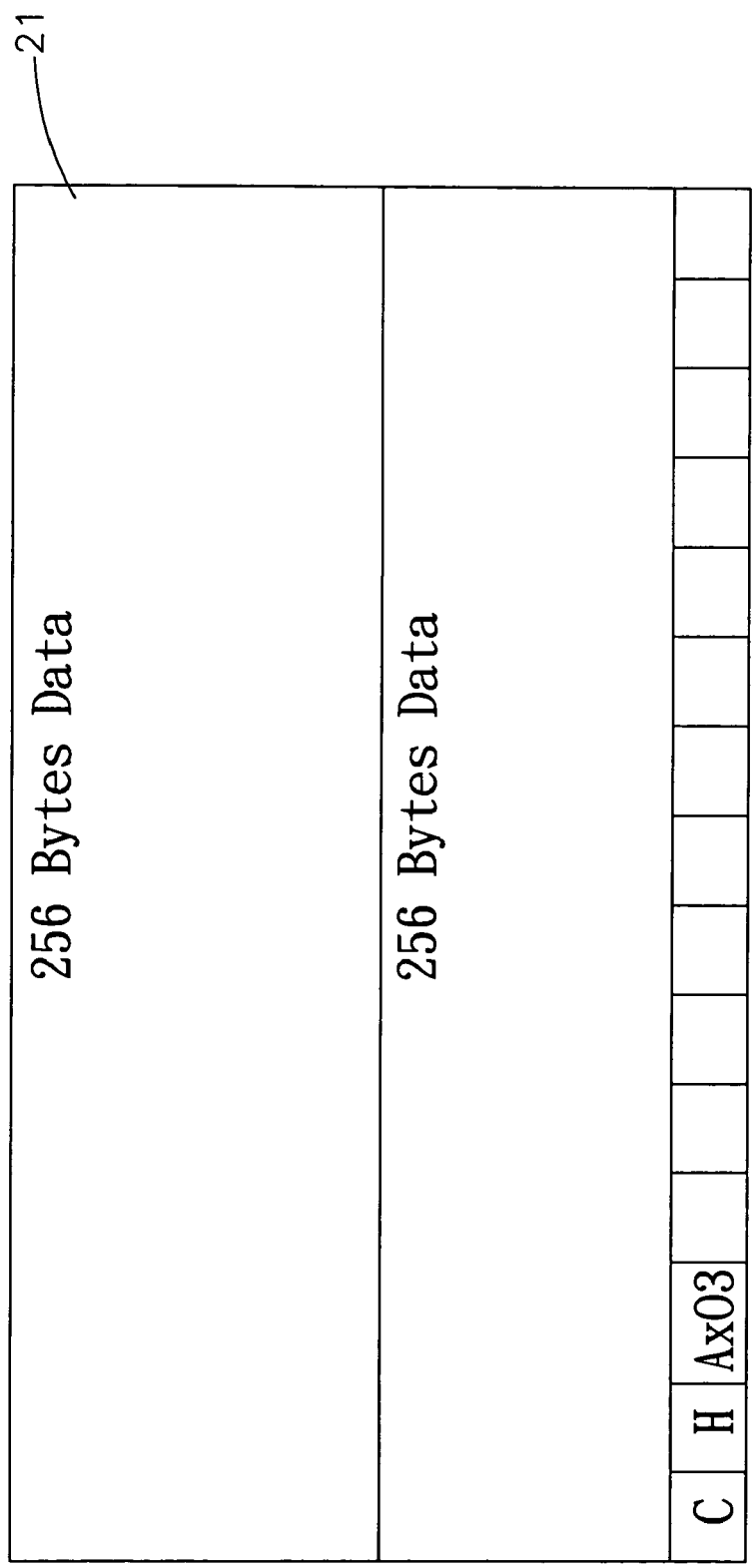
FIG. 8B is a flow chart of a check area in the writing method according to a preferred embodiment of the present invention.
Figure 9A:
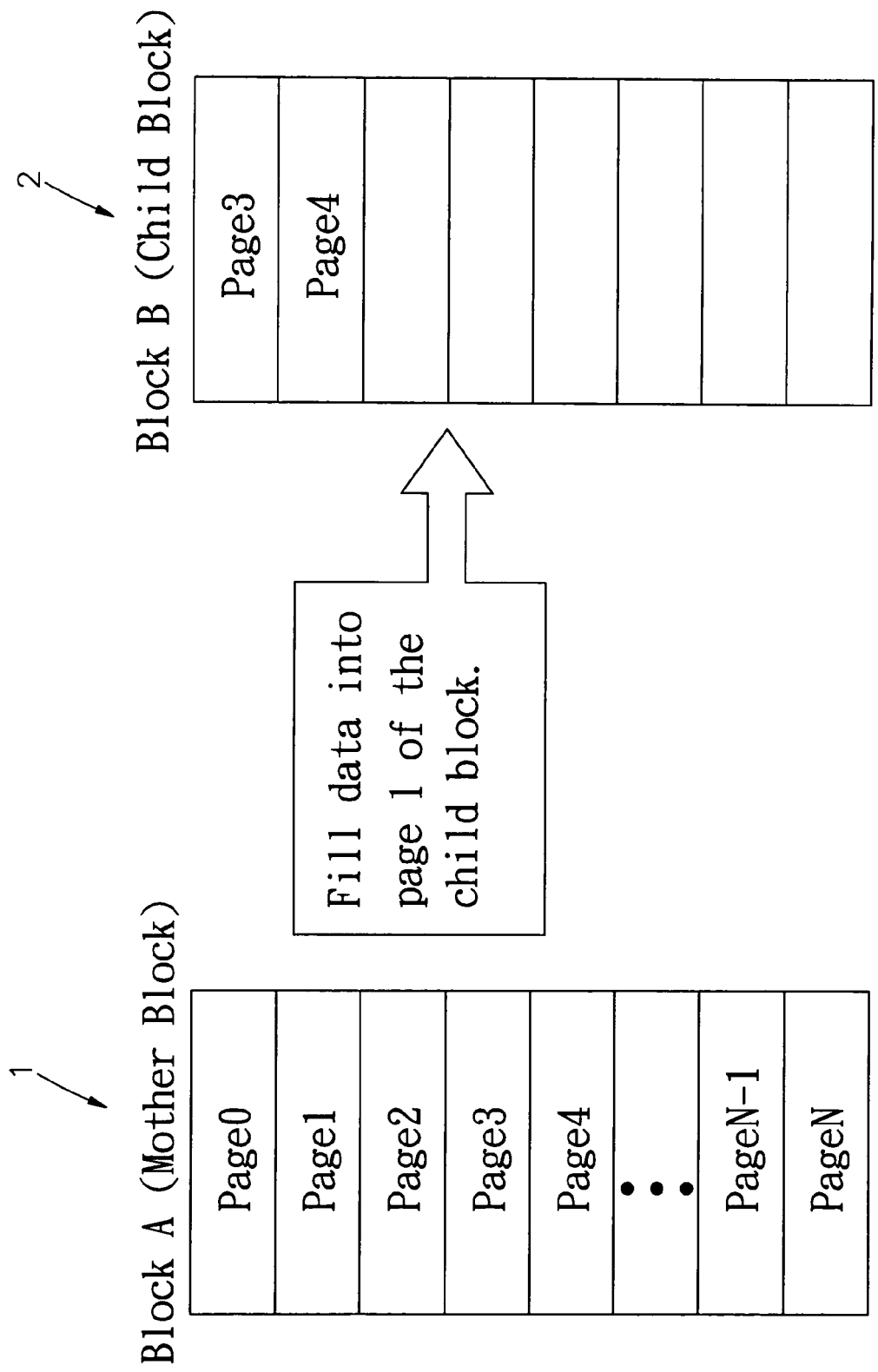
FIG. 9A is a flow chart showing a writing method according to a preferred embodiment of the present invention.
Figure 9B:
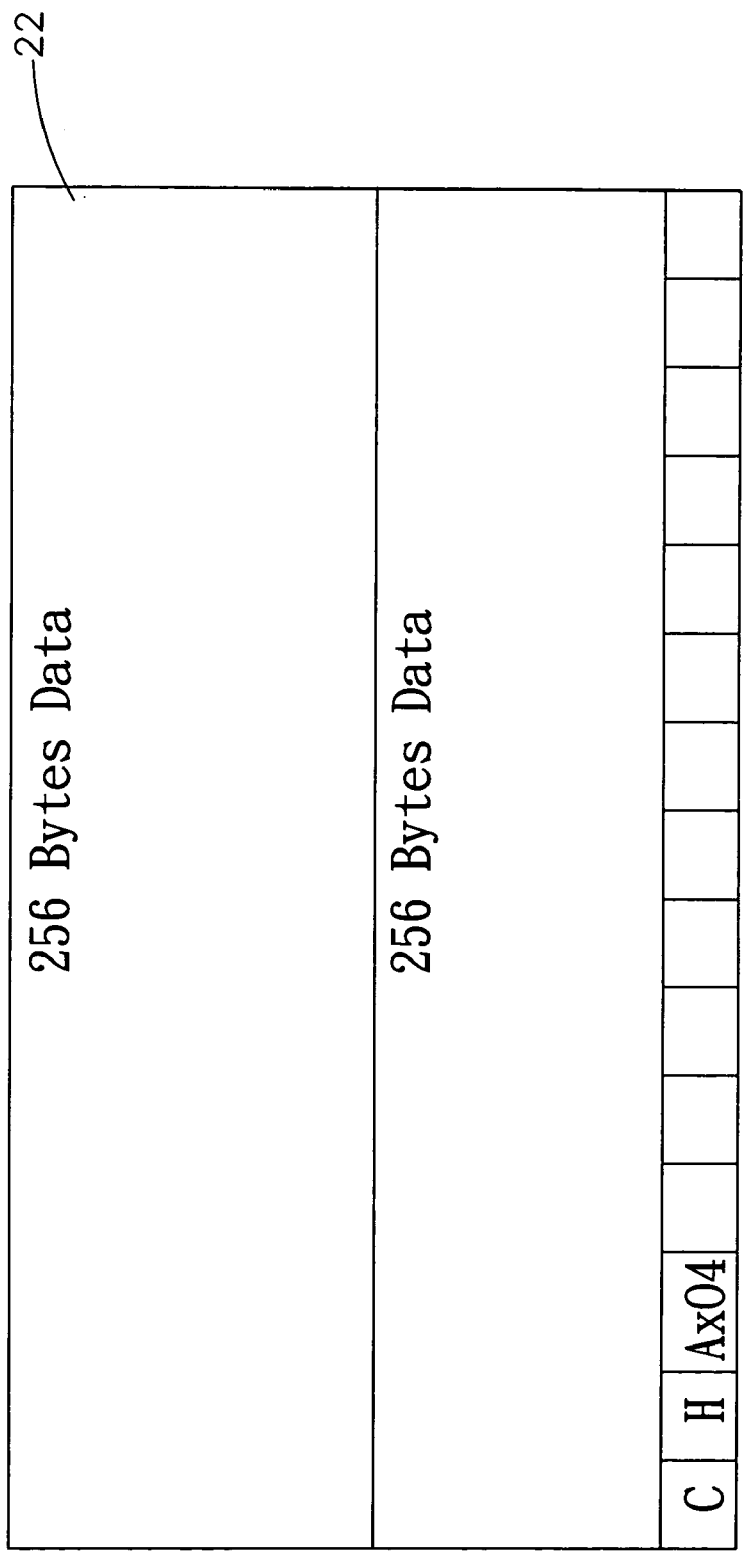
FIG. 9B is a flow chart of a check area in the writing method according to a preferred embodiment of the present invention.

Referring to FIG. 7, a flow chart shows a writing method according a preferred embodiment of the present invention. As shown, the host locates a new block and defines this new block as child block 2 and defines block A as mother block 1, and then writes into the page 3 and 4 of the block A in the logic page of the flash memory. Next, the host writes data into page 0 of child block 2 (shown in FIG. 8A). Meanwhile, the manager marks the first and the second byte in the redundant page 21 of page 0 of child block 2 as C and H respectively to indicate that page 0 belongs to child block 2. The manager also marks the third byte in the redundant area 21 of page 0 as A×03 to define that the page 0 of child block 2 is page 3 of mother block 1 for including a check area in page 0 (as shown in FIG. 8B). Furthermore, to write data into page 1 of child block 2 (shown in FIG. 9A), the manager marks the first and the second byte in the redundant area 22 of page 1 in child block as C and H to indicate that page 1 belongs to child block 2. The manager also to marks the third byte in the redundant area 22 of page 1 as A×04 to define that the page 1 of child block 2 is page 4 of mother block 1 for including a check area in page 1 (as shown in FIG. 9B).

Further, when the host is ready for reading the page in mother block 1 of the logic page, the manager, first of all, reads the child block 2 that corresponds to the mother block 1 in the logic page, whereas the rest of the unmarked pages in child block 2 will be read all from the pages of mother block 1.

Figure 10A:
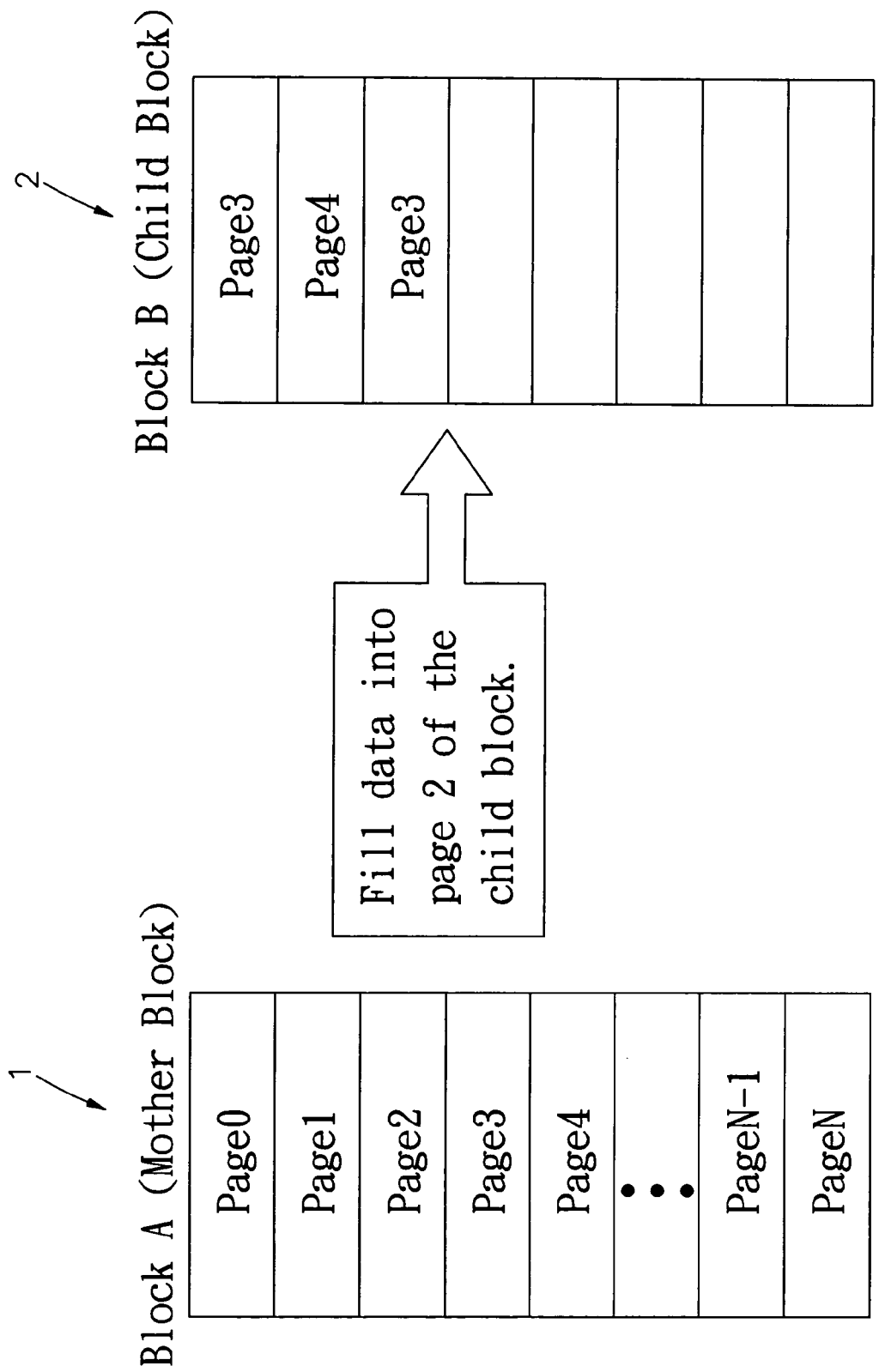
FIG. 10A is a flow chart showing a writing method according to a preferred embodiment of the present invention.
Figure 10B:
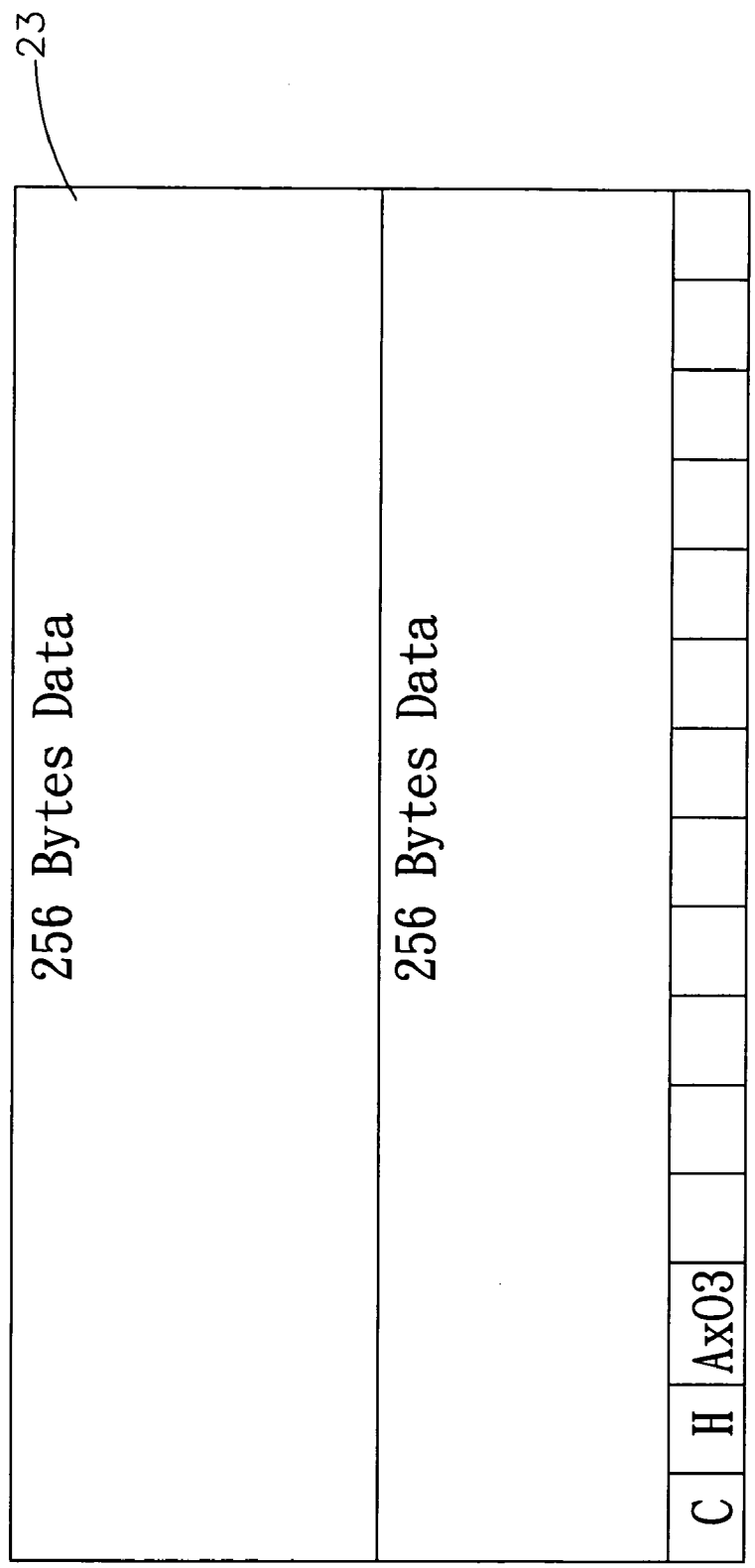
FIG. 10B is a flow chart of a check area in the writing method according to a preferred embodiment of the present invention.

Referring to FIGS. 10A and 10B, a flow chart of the writing method and a flow chart of a check area in the writing method according a preferred embodiment of the present invention are respectively shown. As shown, when the manager writes data into page 3 in mother block 1 of the flash memory, the method of writing is similar to the above-mention procedure. In order to write data in an orderly manner into page 2 of child block 2, the manager marks the first and the second byte in the redundant page 23 of page 2 of child block 2 as C and H to indicate that page 2 belongs to child block 2. The manager also marks the third byte in the redundant area 23 of page 2 as A×03 to define that the page 2 of child block 2 is page 3 of mother block 1 for including a check area in page 2.

Figure 11:
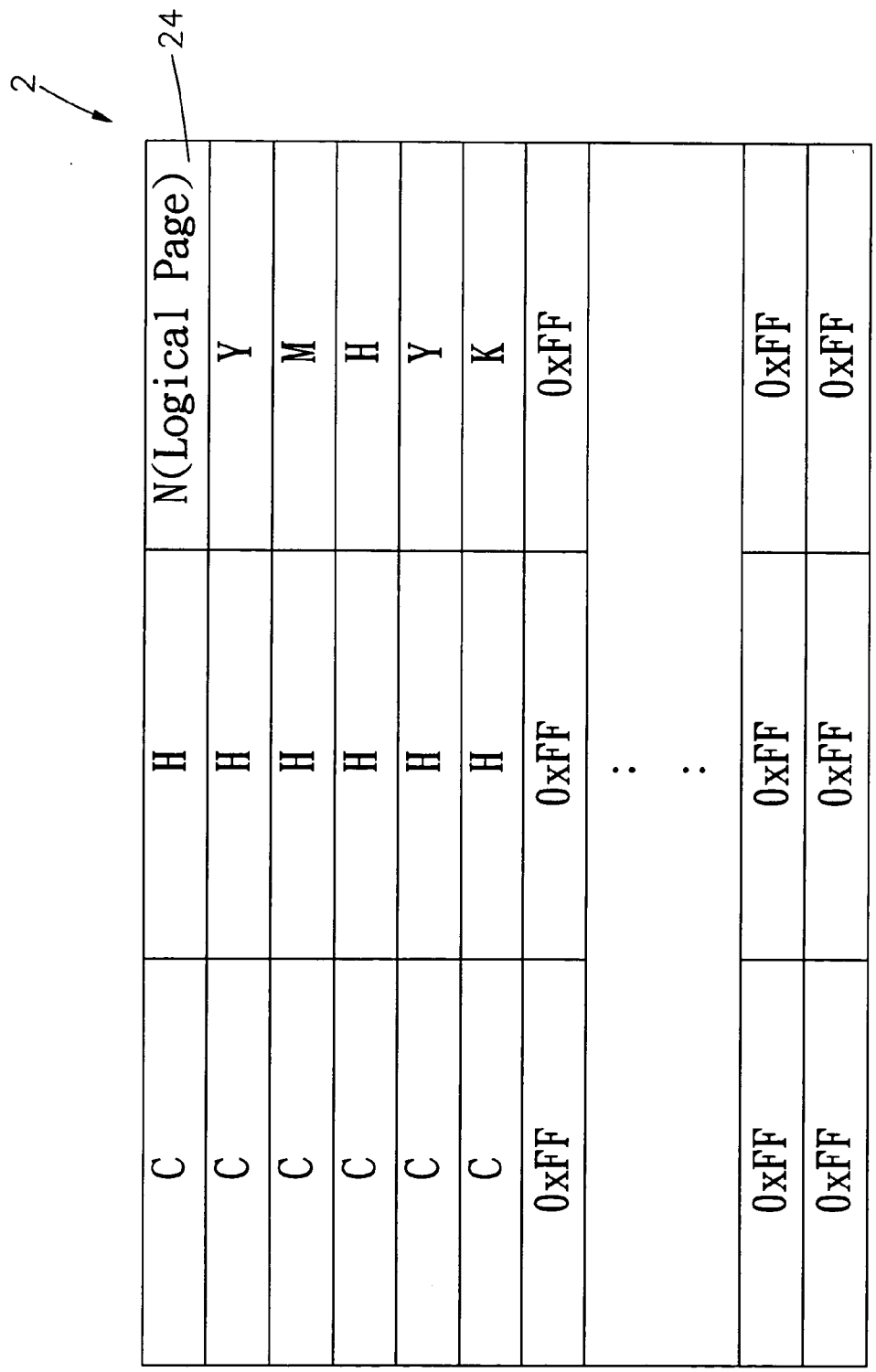
FIG. 11 is a logic page in the child block according to a preferred embodiment of the present invention.

And now, in order to differentiate mother block 1 and child block 2, the check area in the page of child block 2 is examined, the child block 2 obtains marks C and H. In order to analyze whether the data therein is new or old, the check page is examined. Referring to FIG. 11, shows a logic page in the child block according to a preferred embodiment of the present invention, wherein the logic page 24 is consisted of checks of every page in child block 2, and only anterior 6 pages are valid pages and the rest of them are empty (having no data), and page 1 and 4 are both page Y in the logic page, meaning that the manager have written twice to page Y of the logic page and finally page 4 of child block 2 replaces page 1 and becomes the true data in page Y of the logic page. Therefore, the manager needs to read from page 4 of child block 2 for reading page Y in the logic page, as well as to read from page 5 of child block 2 for reading page K in the logic page, and the rest of the pages not being marked in child block 2 are read from the logic page, thus the manager can read out the data easily.

If the manager keeps on writing data to a particular page of the block, there is no need for the manager to move all the data to the new block and to erase the old one, accordingly, not only the speed of the writing data can be substantially promoted but also the frequency of the erasing is substantially reduced to increase the service life of the flash memory.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

The invention claimed is:

1. A linking method under a mother and child block architecture for building a check area and a logical page of a child block in a flash memory, wherein when a host writes data into a logical block of said flash memory, the linking method comprising:

defining a block corresponding to said logical block as a mother block;

locating a new block from a backup block and defining said new block as a child block, wherein said mother block and said child block have the same logical address;

recording the data into a page of said child block, while retaining original data in said mother block;

using a redundant page, which stores metadata in said child block for creating a check area;

recording said redundant page of said child block which corresponds to a page in said mother block; and using said check area consisting of a logical page for identifying whether the data to be retrieved is stored in said mother block or child block when a subsequent read is performed;

wherein said check area in said redundant page of child block is defined as three bytes, wherein a first and second byte indicate pages of said child block and a third byte indicates a page of said mother block.

2. The linking method under a mother and a child block architecture for building a check area and a logical page of a child block according to claim 1, wherein when a host is ready for reading said page in said logical page, said child block corresponding to said mother block in said logical page is read and other pages in said child block are read all from said pages of said mother block.

3. The linking method under a mother and a child block architecture for building a check area and a logical page of a child block according to claim 1, wherein when said host repeats writing data into said logical page of the child block, the data being written to a full page of said child block and when said logical page of child block is full, a new block is located for moving a valid block of said mother block and said child block into therein and then said mother block and child block are erased.

* * * * *